United States Patent [19]

Columbus

[11] 4,032,487

[45] June 28, 1977

[54] AQUEOUS ACRYLATE-EPOXY SILANE CROSSLINKER ADHESIVE DISPERSION COMPOSITION

[75] Inventor: Peter Spiros Columbus, Whitestone, N.Y.

[73] Assignee: Borden, Inc., Columbus, Ohio

[22] Filed: Apr. 12, 1976

[21] Appl. No.: 676,046

Related U.S. Application Data

[63] Continuation-in-part of Ser. No. 453,245, March 21, 1974, abandoned.

[52] U.S. Cl. .............................. 260/17 R; 156/329; 260/29.6 H; 260/29.6 TA; 260/29.15 B; 260/29.2 R; 260/29.2 N; 260/824 EP; 260/827; 428/442; 428/426; 428/494

[51] Int. Cl.² .......................................... C08L 1/28

[58] Field of Search .............. 260/29.6 H, 29.6 TA, 260/34, 29.15 B, 29.2 R, 29.2 N, 824 EP, 827, 17 A

[56] References Cited

UNITED STATES PATENTS 3,759,915   9/1973   Kotte ............................. 260/42.52

*Primary Examiner*—Edward M. Woodberry
*Attorney, Agent, or Firm*—George A. Kap; George P. Maskas; Daniel D. Mast

[57] ABSTRACT

An adhesive composition which comprises, for each 100 parts by weight thereof, an aqueous dispersion having pH of about 8 to 12 of the following components dispersed in 25 to 75 parts of water:

A. from 25 to 75 parts by weight of water insoluble linear polymer containing the following interpolymerized unsaturated monomers in parts by weight based on the weight of the polymer:
   1. at least 50 parts and up to 99 parts of an acrylate monomer containing from about 4 to 27 carbon atoms selected from alkyl acrylates, alkyl methacrylates, and mixtures thereof:
   2. from about 0.1 to 10 parts of a nitrogen monomer selected from vinyl amines and salts thereof; vinyl ureido monomers; vinyl compounds having heterocyclic nitrogen containing groups and halogen, hydroxyalkyl or aminoalkyl substituted derivatives thereof; amino and loweralkyl amino loweralkyl acrylates and methacrylates; and mixtures thereof;
   3. from about 0.1 to 25 parts of an acid selected from acrylic acid, methacrylic acid and mixtures thereof;
B. from a small but effective amount to effect crosslinking of the polymer to 5 parts of a silane containing both alkoxy and epoxy functionalities.

12 Claims, No Drawings

AQUEOUS ACRYLATE-EPOXY SILANE CROSSLINKER ADHESIVE DISPERSION COMPOSITION

REFERENCE TO RELATED APPLICATION

This is a continuation-in-part application of application Ser. No. 453,245 which was filed on Mar. 21, 1974 and now abandoned.

BACKGROUND OF THE INVENTION

The present invention is directed to an adhesive useful for adhering siliceous containing material to itself or to a substrate. Preferably, the siliceous material or substrate if porous. The substrate can be siliceous or nonsiliceous. These adhesive compositions have particular utility in adhering window glass to the framing; repairing broken glass and china; and mending siliceous materials and adhering them to other substrates such as plaster, wallboard, or wood substrates. The adhesives of the present invention are substantially or entirely free of organic solvents since they are aqueous dispersions or polyacrylates mixed with epoxysilanes wherein the silicon atom of said silane is substituted with hydrolyzable alkoxy groups.

Various adhesives are formulated for application to siliceous substrates. The most useful of this particular class of adhesives are the silicones. These materials fall into the one-package type and the two-package type. The one-package type is cured by a reaction induced by water vapor in the atmosphere causing a hydrolysis of groups from a silicon atoms. The hydrolyzable groups are generally acetoxy groups or hexylamine groups. The use of these one-package silicones results in the release of acetic acid or hexylamine fumes into the air. Both of these materials have an unpleasant odor. The two-package silicone adhesives give off a much more pleasant odor because the hydrolyzable groups employed result in alcohol fumes being given off. There is however, a necessity for mixing two reactive components to form the adhesive and also the necessity for applying the adhesive to the substrate before it is cured. Another drawback of the silicone adhesives is their low tensile strength. Another deficiency in the silicone adhesive is their release properties. After silicone adhesives are cured, it is very difficult to obtain adhesion to the cured silicone surface. This results in the silicone being very effective as a release coating. This release property results in silicones being undesirable in industries such as the automotive industry since paint will not stick to surfaces which have accidentally come into contact with silicone. Another disadvantage of silicone adhesives is their inability to adhere to wet surfaces. In addition, these silicone adhesives are difficult to remove from skin and tools when cleaning up.

Aqueous dispersion type acrylic adhesives again, including sealants, on the other hand, have many desirable properties not found in the silicone types. One desirable property is their high tensile strength. Other advantages of aqueous acrylic dispersions is their low odor and ease of clean-up. Acrylic adhesives of the prior art based upon acrylic dispersions, however, have less than the desirable degree of water insolubility and do not adhere as well as is desired to smooth siliceous substrates such as glass. The adhesion of certain acrylic emulsions used as coating has in the past been improved by the addition of epoxies. U.S. Pat. No. 2,880,116 of Alps, patented Mar. 31, 1959, discloses formulating an acrylic with an epoxide to improve the adhesion of the coating composition to leather, specifically, and to other materials such as glass, generally. U.S. Pat. No. 3,117,170 of Lund, patented Apr. 6, 1965, also involves the presence of an epoxide and a silicone in a coating composition for glass. The Lund patent, however, involves the use of volatile organic solvent, an epoxide group on the acrylic polymer and carboxyl group on the silicone. The Lund patent is not directed to an adhesive composition and has the disadvantage in that its use necessitates the evaporation of aromatic hydrocarbon solvent. Another disadvantage of the Lund system is that heat is required for cure. There are also acrylic caulking compounds on the market which contain epoxy-silanes. These types of caulking compounds are disclosed in U.S. Pat. Nos. 3,759,915 and 3,786,020 of Emmons. They are solvent-based materials.

SUMMARY OF THE INVENTION

The shortcomings of the silicone adhesives enumerated above and the shortcomings of the acrylic adhesive and coating compositions enumerated above have been overcome by the adhesives, including sealants, of the present invention. The adhesives of the present invention do not give off noxious odors, do not form release coatings, cure at ambient temperatures for example 10°–25° C, are easy to apply and clean up, give final bonds with high tensile strength and water resistance.

The adhesives of the present invention are also superior to the glass coating compositions of Lund mentioned above in that they need not contain organic solvents which evaporate off on drying, do not require baking to effect the cure and are useful as adhesives for securing siliceous surfaces to other surfaces.

In addition to the above recited advantages over the prior art, the adhesives, including sealants, of the present invention have the following attributes in that they are useful for sealing windows and windshields into their framing and particularly for sealing leaky windows and windshields to prevent leakage; water-based adhesives, therefore have no harmful fumes; are non-sniffable; nonflammable; nontoxic; nonirritating to the eyes; fast drying; crystal clear and colorless when dry; milky white when wet so that their application area can be easily ascertained; a tough and flexible film-forming material; adherent to glass, synthetic rubber, stainless steel, painted steel, aluminum and wood (these are just examples of the painted and unpainted surfaces on which they can be used); water-resistant after drying; resistant to heat, cold, sunlight and oxidation; resistant to oil, gasoline and detergents; easy to apply, no sticky, stringy mess; easy to clean up; stable in containers on storage; freeze-thaw stable, and useful for mending broken china, pottery, ceramic dishes, and ceramic tile.

DESCRIPTION OF THE PREFERRED EMBODIMENT

An adhesive composition which comprises, for each 100 parts by weight thereof, an aqueous dispersion having pH of of about 8 to 12 of the following components dispersed in 25 to 75 parts of water:
  A. up to 5 parts of silane to crosslink the binder polymer; and B. from 25 to 75 parts by weight of water insoluble linear binder polymer having the following structural formula:

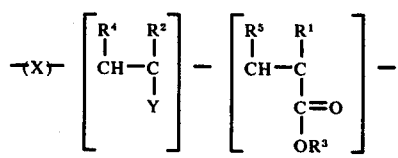

I (vinyl)   II (nitrogen)   III (acrylate)

Where $R^1$ and $R^2$, which can be same or different, are selected from H, lower alkyl groups of 1 to 4 carbon atoms, halogens, —CH$_2$COOR, —COOR and —CH$_2$COOH groups where R is lower alkyl group of 1 to 8 carbon atoms;

$R^3$ is selected from H and lower alkyl groups of 1 to 8 carbon atoms, at least a portion of $R^3$ radical being H to give free carboxyl groups;

$R^4$ and $R^5$, which can be same or different, are selected from H, —COOH and —COOR groups where R contains from 1 to 8 carbon atoms;

X is derived from copolymerizable vinyl monomers and is different from the acrylate monomer or monomers III;

Y is a nitrogen containing radical of unit II which is derived from a nitrogen-containing monomer; radical Y is selected from the following radicals:

   IV

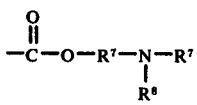   V

—N—R$^9$   VI

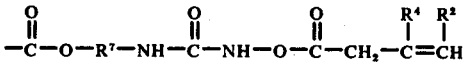   VII

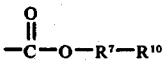   VIII

Where $R^6$ is selected from H, —R$^7$NR$^8$ and —R$^7$OH;

$R^7$ and $R^8$ being same or different lower alkyl radicals of 1 to 5 carbon atoms, preferably from 1 to 2;

$R^9$ is a heterocyclic nitrogen-containing group, such as substituted ethylene urea;

$R^{10}$ is a heterocyclic nitrogen-containing group, such as the pyridyl group;

As to amounts of each, the monomer from which unit I is derived can vary from at least 50% by weight up to about 99%, based on the weight of the binder polymer.

The nitrogen unit II is derived from a monomer which can be used in amount of 0.1 to 10% by weight of the binder polymer. The acrylate unit III is derived from a monomer which is present in an amount of at least 0.1 to 25% by weight of the binder polymer, preferably 1 to 5% and optimally from 1.5 to 3.5%.

The vinyl monomer contains one of the following groups:

vinyl: CH$_2$=CH— vinylene: —CH=C—

Whether homopolymerizable or not, the vinyl monomer is optional. Examples thereof are the alpha-beta ethylenically unsaturated monocarboxylic acids and esters thereof, alpha-beta ethylenically unsaturated aldehydes, alpha-beta ethylenically unsaturated dicarboxylic acids and esters, amides, and half esters thereof, alpha-beta ethylenically unsaturated nitriles, hydrocarbons such as alphaolefins, conjugated diolefins, vinylaryl compounds, vinyl alkyl ethers, vinyl halides, vinylidene halides, vinyl sulfides and vinyl acryloxy compounds (esters of saturated carboxylic acids and ethylenically unsaturated alkanols). The vinyl polymers and methods for their preparation are well known.

Specific examples of suitable vinyl monomers which may be copolymerized to obtain the water-insoluble polymers for use according to the invention in addition to the unsaturated acid monomers and esters thereof with alkanols having 1 to 20 carbon atoms, such as methanol, ethanol, butanol, pentadecanol and the like, are acrolein, methacrolein, ethylene, propylene, isobutene, butadiene, isoprene, chloroprene, styrene, vinyltoluene, vinyl methyl ether, vinyl isobutyl ether, vinyl chloride, vinyl bromide, vinylidene chloride, vinyl sulfide, vinyl acetate and vinyl propionate. Copolymers, and graft, block, or segmented polymers are included. Conventional methods of obtaining the binder polymers are utilized.

The vinyl monomer includes the soft and the hard monomers. The soft monomer, which imparts resiliency, may be represented by the following formula

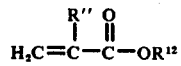

wherein R'' is H or alkyl having 1 to 4 carbon atoms and $R^{12}$ is the straight chain or branched chain radical of a primary or secondary alkanol, alkoxyalkanol or alkylthioalkanol, and having from 1 up to about 14 carbon atoms, examples being ethyl, propyl, n-butyl, 2-ethylhexyl, heptyl, hexyl, octyl, propyl, 2-methylbutyl, 1-methylbutyl, butoxybutyl, 2-methylpentyl, methoxymethyl, ethoxyethyl, cyclohexyl, n-hexyl isobutyl, ethylthioethyl, methylthioethyl, ethylthiopropyl, n-octyl, 6-methylnonyl, decyl, dodecyl, and the like; said radical $R^{12}$, when alkyl, having from 2 to about 14 carbon atoms, preferably from 3 to 12 carbon atoms, when $R^{11}$ is H or methyl. When $R^{11}$ is alkyl and $R^{12}$ is alkyl, $R^{12}$ should have from about 6 to about 14 carbon atoms and when $R^{11}$ is H and $R^{12}$ is alkyl, $R^{12}$ should have from about 2 to about 12 carbon atoms, in order to qualify as a soft monomer. Amount of the soft monomer may vary up to 100% of the acrylate monomer.

Other ethylenically unsaturated copolymerizable vinyl monomers, the homopolymers of which have a much higher Tg, are used in combinations with the above mentioned soft monomers provided they do not adversely affect the desired properties of the adhesive e.g., unduly raise the overall Tg. The hard acrylic monomer may be represented by the formula

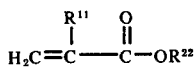

wherein $R^{11}$ is as above. $R^{22}$ is preferably alkyl and is methyl or alkyl having from about 13 to about 20 carbon atoms when $R^{11}$ is H, and is alkyl of from 1 to about 5 carbon atoms or alkyl of from about 15 to 20 carbon atoms when $R^{11}$ is methyl.

It can be seen from above that for alkyl acrylates and alkyl methacrylates, the Tg at first decreases with an increased chain length of the alkyl group and the Tg again increases; i.e. both hard and soft monomers are known to occur in each group of monomers. Examples of these hard monomers and other hard monomers include: methyl acrylate, acrylamide, vinyl acetate, tetradecyl acrylate, pentadecyl acrylate, methyl methacrylate, ethyl methacrylate, t-butyl acrylate, butyl methacrylate, styrene, pentadecyl methacrylate, vinyl toluene, methacrylamide, and N-methyloacrylamide. The hard monomer may vary up to 60% of the vinyl monomer.

As is known, for a given number of carbon atoms in the alcohol moiety, the extent and type of branching markedly influences the Tg, the straight chain products giving the lower Tg. The Tg is directly related to the minimal-film-forming-temperature of the acrylic dispersion in that at the Tg point, the affinity of the dispersed polymer particles for one another is increased to the effect that they coalesce forming a continuous film.

As is apparent, an important property of the binder polymer is the Tg thereof and minimal-film-forming-temperature of its dispersion. The Tg and the minimal-film-forming temperature of its dispersion are closely related both numerically and in respect to efficacy. Consequently, the selection of monomers and proportions thereof for specific end uses depends upon their influence on the Tg and minimal-film-forming temperature. For a windshield sealant or other application where flexibility is required, the Tg of the polymer should be below 15° C, preferably below 0° C, (i.e., it must give a rubbery product) and is more preferably below −10° C. For mending broken china or glass, the Tg of the polymer should be above 10° C and preferably below 25° C. Tg is a conventional criterion of polymer hardness and is described by Flory, "Principles of Polymer Chemistry" pp. 56 and 57 (1953), Cornell University Press, see also pp. 61–63, Interscience (1966). While actual measurement of the Tg is preferred, it may be calculated as described by Fox, Bull. Am. Physics Soc. 1, 3, p. 123 (1956). Examples of the Tg of hompolymers and the inherent Tg thereof which permits such calculations are as follows:

| Homopolymer of: | Tg °C |
|---|---|
| n-octyl acrylate | −80 |
| n-decyl methacrylate | −60 |
| 2-ethylhexyl acrylate | −70 |
| n-butyl acrylate | −56 |
| octyl methacrylate | −20 |
| n-tetradecyl methacrylate | −9 |
| methyl acrylate | 9 |
| n-tetradecyl acrylate | 20 |
| t-butyl acrylate | 43 |
| methyl methacrylate | 105 |
| acrylic acid | 106 |

These or other monomers are blended to give the desired Tg of the copolymer.

The Unit II, which is derived from a nitrogen monomer, is selected from vinyl amines and salts thereof; vinyl ureido monomers; vinyl compounds having heterocyclic nitrogen-containing groups and halogen, hydroxyalkyl or aminoalkyl substituted derivatives thereof, whether homopolymers or copolymers; the vinyl pyridines such as pyridyl loweralkyl acrylates and methacrylates; primary amino compounds such as beta-aminoethyl vinyl ether and aminopentyl vinyl ether, secondary amino-containing compounds such as secondary amyl t-butyl aminoethyl methacrylate, amino and loweralkyl amino loweralkyl acrylates and methacrylates, tertiary amino-containing compounds such as t-dimethylaminoethyl methacrylate, and the applied amine salts such as the chlorides or hydroxides thereof; ureido monomers such as are disclosed in U.S. Pat. Nos. 2,881,171 and 2,881,115 to Hankins, No. 3,300,429 to Glavis and Keighly, and No. 3,356,627 to Scott, examples being beta-ureidoethyl acrylate, beta-(N,N'-ethyleneureido) ethyl acid maleate, beta-ureidoethyl vinyl ether, N-vinyl-N,N'-ethyleneurea, N-vinyloxyethyl-N,N'-ethyleneurea, N-methacrylamidomethyl-N,N'-ethyleneurea, and N-dimethylaminoethyl-N'-vinyl-N,N'-ethyleneurea, beta-hydroxyethyl methacrylate, N-hydroxyethylacrylamide, N-methylolacrylamide, and N-(dimethylaminoethyl) acrylamide. Also included are the half amides and the ammonium and amine salts discussed above in conjunction with the carboxylic acids. Those salts discussed above can fulfill both the carboxylic acid requirements of the present invention as can the half amides containing free carboxylic acid groups. The nitrogen in the nitrogen monomer, is an amine, or a heterocyclic compound containing nitrogen in the ring. Other compounds and patents disclosing these types of compounds, polymers thereof and their preparation include: quaternary amine groups (U.S. pat. No. 3,766,156, Kine, 1973), heterocyclics (U.S. Pat. No. 3,267,082, de Benneville et al, 1966, No. 3,342,786 Emmons, 1967, 3,037,955, Carman, 1962), aminoalkyl (U.S. Pat. No. 2,990,402, Gehshan, 1971), oxazolidines (U.S. Pat. No. 3,037,006, Hankins, 1962), hydratoins (U.S. Pat. No. 3,369,010, Kelly, 1968) and ureas (U.S. Pat. No. 2,840,545, Yost, 1958).

Although the definition of vinyl monomer and the acrylate monomer may overlap, it is important to bear in mind that during preparation of the binder polymer, these two monomers are not the same. Unit III, or the acrylate monomer, is selected from alpha, beta unsaturated carboxylic acid, preferably acrylic or methacrylic acid. To emplify, the unsaturated carboxylic acid may be a simple monocarboxylic acid, a polycarboxylic acid, or may be a partial ester of such alpha, beta unsaturated carboxylic and polycarboxylic acids, and salts thereof with a volatile base such as ammonia, or with a volatile water soluble samine such as dimethylamine, etc. Examples of copolymerizable ethylenically unsaturated monocarboxylic or polycarboxylic acids are sorbic, acryloxyacetic, acryloxypropionic, cinnamic, vinyl furoic, alpha-chlorosorbic, methacryloxypropionic, methacryloxacetic, p-vinylbenxoic, acrylic, methacrylic, maleic, fumaric, aconitic, atropic, crotonic, and itaconic acid, or mixtures thereof, with itaconic acid and the alpha-beta unsaturated monocarboxylic acid, particularly methacrylic acid and acrylic acid, being preferred.

High molecular weight polymers, e.g. 10,000 to several million, obtained by emulsion polymerization or other methods and of water-insoluble character when in acid form, are used as the binder polymer. Preferably, the binder polymer has a molecular weight of 10,000 to 600,000 or more.

The minimal film-forming temperatures of the dispersions described herein are 8° to 10° C for a low range and 18° to 20° C for high range.

The substrates with which the invention is concerned include all siliceous materials such as glass sheets, fiberglass textiles, asbestos sheets, asbestos cement products, concrete, stone, stucco, slate, sandstone, granite, ceramics, and porcelain. The adhesives of the present invention are particularly valuable in that they can be used directly on any of the substrates without the need of a priming coat.

The adhesive compositions of this invention are formulated to provide good freeze-thaw stability such as by the use of free carboxyl containing acrylic monomers in the binder polymer and optionally, the presence of hydroxyethyl cellulose also acts as a thickener when one is required. The hydroxyethyl cellulose is one of the few thickeners which does not interfere with the function of the epoxy silane. The lack of water resistance inherent in prior art acrylic adhesives is overcome by the incorporation of a small amount of an epoxy silane, preferably gamma-glycidoxypropyltrimethoxysilane, to the aqueous dispersion, and the incorporation of a small amount of carboxylic acid groups and nitrogen containing groups as pendant groups on the binder polymer. Though not wishing to be bound by theory, it is postulated that the nitrogen containing groups catalyze a reaction between the carboxylic acid groups on the polymer and the epoxy groups on the silane. The silane in addition to the epoxy functional group also contains hydrolyzable alkoxy groups attached directly to the silicone atom. These hydrolyze in the presence of water yielding reactive silanol groups which again it is postulated react with the siliceous surface to which they are applied to form a Si-O-Si-bond chemically linking the adhesive to the silicate substrate.

In addition, the silane, perhaps by self-condensation and in forming polysiloxane epoxides, crosslinks the acrylic polymer, improves the adhesive and cohesive properties of the acrylic composition and also improves its water-resistance. Again, the chemical reaction which occurs is only postulated and only the end results are apparent.

Illustrative of epoxy-silanes which can be employed in the composition of this invention are beta-(3,4 epoxy-cyclohexyl) ethyl-trimethoxysilane 

gamma-glycidoxy-propyl-tri-methoxysilane 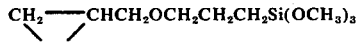

epoxytriethoxysilane 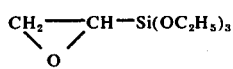

The important criteria for the epoxy-silane is that it contain both epoxy functional groups and hydrolyzable alkoxy radicals attached to the silicon atom.

Conventional thickeners can also be employed in the practice of the present invention. The preferred thickener is hydroxyethyl cellulose particularly a hydroxyethyl cellulose having a Brookfield viscosity at 25° C in a 1% concentration in water of 2,000± 500 cps. The hydroxyethyl cellulose is completely compatible with all of the ingredients, adds to the toughness of the dry film, acts as a protective colloid adding to the dispersion stability and freeze-thaw resistance, renders the product thioxtropic (or pseudoplastic), does not interfere with clarity of dry film and is easy to disperse when preparing thickener intermediate. The thickener is present at a level of from 0.05 to 2.0% by weight (preferably 0.05 to 1.0) of the final composition.

While the above general ranges of components form the useful adhesives of this invention, more specific formulations can be tailored for more specific uses. For example, if the acrylic binder polymer contains a major proportion of hard monomer such as methylmethacrylate and a minor proportion of a soft monomer such as ethylacrylate, the polymer is harder than if the proportions are reversed, therefore, for a ceramic adhesive which requires little flexibility it is preferred that the binder polymer contain 40 to 50% by weight, based upon the total binder polymer weight, of soft monomer such as ethylacrylate and from 50 to 60% by weight, based upon the total binder polymer, of a hard monomer such as methylmethacrylate. The high percentage of hard monomer such as methylmethacrylate not only provides hardness and the desired lower level of flexibility but also provides high-temperature resistance which is desirable in dishwashers if the ceramic adhesive is used to mend broken china. The ethylacrylate being the softer polymer is more sensitive to heat.

On the other hand, when a windshield sealer is required, a higher degree of flexibility is often necessary especially where the windshield is set into a flexible rubber framing. The term "rubber" includes rubber substitutes such as foamed polyurethane. The flexibility is imparted by increasing the amount of ethylacrylate in the polymer. For a windshield sealer application, it is preferred that the polymer contain from 55% to 75% of ethylacrylate and from 25 to 45% by weight of methylmethacrylate. The weight again based upon the total weight of the binder polymer.

The adhesive composition described herein can be produced by polymerization of the recited monomers by an emulsion technique in which the monomers are emulsified by non-ionic, cationic or anionic emulsifiers or suitable mixtures thereof. When persulfates are used as initiators, stable latices may be obtained even without including an emulsifier initially in the polymerization system. The emulsifiers are retained in the final dispersion to provide stability.

The polymerization may be effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis (alpha-gamma-dimethylvaleronitrile), azobis (alpha-methylbutyronitrile), azobis (alpha-methylvaleronitrile), dimethyl or diethyl azobismethylvalerate and the like.

A redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite or metabisulfite, or hydrosulfite or hydrazine. The action of the redox system may be controlled through use of a chain transfer agent or regulator such as mercaptoethanol or other mercaptan. Such regulator also finds use outside of redox systems with organic or inorganic peroxides and with azo catalysts, such as azodiisobutyronitrile, azodiisobutyramide or diethyl azodiisobutyrate. Examples of suitable non-ionic emulsifiers include the higher alkyl phenoxypolyethoxyethanols in which alkyl group has from 6 to 18 carbon atoms, such as octyl dodecyl or octadecyl and then may be from 8 to 50 more oxyethylene units. Examples of anionic emulsifiers include the higher fatty alcohol sulfates, such as sodium lauryl sulfate; examples of cationic emulsifiers include higher alkyl pyridinium halides such as lauryl pyridinium chloride, (octylbenzyl)-trimethylammonium chloride and so on.

The procedure for formulating the adhesive is quite straight forward. The term adhesive used herein is to be considered in its broad sense both in the specification and claims as including sealants. The formulating procedure involves first adding a small quantity of aqueous dispersion of the binder polymer to a mixing tank. The suspending agent is then slowly added to produce a uniform mixture. The remainder of the aqueous binder polymer dispersion is then added with mixing. The epoxy-silane is then added slowly with continuous mixing.

Additional details of the preparation of adhesive of the present invention is supplied by the following illustrative examples.

EXAMPLE I

To a stainless steel clean tank with agitation is added 12 parts of an aqueous dispersion containing 47% solids. The solids consist of an acrylic polymer containing 38% of ethylacrylate, 58% of methylmethacrylate, 3% of dimethylaminomethylmethacrylate and 1% of acrylic acid.

A thickening and suspending agent intermediate is prepared in a separate stainless steel tank by adding 96.70 parts of water then adding 3.0 parts of hydroxyethyl cellulose, non-reactive with silane, with agitation. The mixture is heated to 85° C. and 0.15 parts of methyl parahydroxy benzoate and 0.15 parts of propyl parahydroxy benzoate are added. The mixing is continued at 85° C for approximately 20 minutes until smooth and homogenous. The mixture is then cooled to 45° C.

To the acrylic dispersion in the tank is then added with agitation 4.75 parts of the suspending agent intermediate. Agitation is continued until the mixture is smooth and homogenous. An additional 82.40 parts of the acrylic polymer is then added slowly with agitation and the agitation is continued until the mixture is again homogeneous. Then 0.75 parts of propylene glycol and 0.10 parts of gamma-glycidoxypropyltrimethoxysilane are slowly added with continued agitation. The agitation is continued for 20 minutes to insure that the mixture is homogenous. The mixture should now have a viscosity using a Brookfield No. 4 spindle at 25° C at 6 rpm of 2,500 to 3,500 cps. Viscosity of 60 rpm should be 500 to 700 cps. If the viscosity is too high, water can be added. The finished product has a pH of 9.0 to 10.0. The solids content is 44± 1.5%. The product is to be marketed in one fluid ounce wax-lined aluminum tubes. Broken china plates and crystal are mending using the above-described adhesive, and after being mended and allowed to cure are washed in a dishwasher using a conventional dishwasher detergent such as Cascade or Electrasol and a a water temperature of 180° F. The adhesive withstands the washing cycle. The adhesive is then tested for tensile strength by breaking the dishes. Once the adhesive film is fully cured, the dishes, in most cases, break in aeas not mended by the adhesive.

The following procedure is followed in mending.

Preparation: Surfaces to be mended must be clean, dry and free from oil, soap, paint, varnish, wax, as well as remnants of any other cement used previously without success. Surfaces to be bonded should be preferably at 60° F or higher.

Procedure for porous ceramics: In most cases, no clamping is necessary. Pressing tube lightly, apply cement to only one surface. After applying the cement, before bringing the pieces together, carefully position the pieces as closely as possible—without allowing contact—when it appears the proper surface contacts will be made, bring the surfaces together and apply pressure for approximately 15–20 seconds (30–40 seconds for heavier pieces). If adequate amount of cement is applied and surfaces are in proper contact, some cement should squeeze out at this point. Wipe off excess cement with clean cloth. Continue with additional pieces following the same procedure. If, after gluing, surfaces come apart for any reason, the cement will set rendering the surfaces less porous so that the procedure below for relatively less porous ceramics must be followed to complete the mending process. Allow to cure overnight before subjecting mended ceramic to dishwasher or any other stress. Full strengths achieved in approximately 3 to 7 days depending on the temperature, humidity and porosity of the ceramic.

Procedure for non-porous (Glass)* and low porosity ceramics (very fine china): Apply cement to one surface—combine surfaces and apply pressure for approximately 1 minute or until piece added remains in position. Gently wipe off excess cement with a clean cloth; wait until cement becomes clear (2–5 minutes) before adding additional piece. For additional pieces, continue following same procedure while subjecting freshly cemented pieces to as little stress as possible, until the job is completed. Allow to cure overnight before subjecting bonded area to any stress.

*Recommended for light-duty ornamental work only.

EXAMPLE II

Windshield Sealant

To a stainless steel tank with agitation is added 10 parts by weight of a 47% solids aqueous dispersion of an acrylic polymer containing 64 parts by weight based upon the weight of the polymer of ethyl acrylate, 32 parts based upon the weight of the polymer of methylmethacrylate, 3 parts based upon the weight of the polymer of dimethylaminomethylmethacrylate and 1 part by weight based upon the weight of the polymer of acrylic acid.

A thickening and suspending agent intermediate is prepared in a separate stainless steel tank by adding 96.70 parts of water then adding 3.0 parts of hydroxyethyl cellulose with agitation. The mixture is heated to 85° C for approximately 20 minutes until smooth and homogenous. The mixture is then cooled to 45° C.

With agitation is then added to the acrylic polymer dispersion 10.0 parts of the suspending agent intermediate and agitation continued until homogenous. Then an additional 5 parts of the same acrylic polymer and 66 parts of a second 47% solids dispersion of an acrylic polymer containing 48 parts by weight based upon the weight of the polymer of ethylacrylate, 48 parts by weight of methylmethacrylate based upon the weight of the polymer, 3% by weight based on the weight of the polymer of dimethylaminomethylmethacrylate and 1 part by weight based upon the weight of the polymer of acrylic acid are then added. Then 0.75 parts of propylene glycol and 0.11 parts of gamma-glycidoxypropyltrimethoxysilane are added with medium agitation. The agitation is continued for 20 minutes. The viscosity of the product should now be 1,400 to 1,800 cps using a Brookfield LVF No. 4 spindle at 25° C at 60 rpm and 6,000 to 8,000 cps at 6 rpm, pH should be 9.0 to 10.0 and the percent solids should be 42 ± 1.5%. The product is packaged in one fluid ounce wax-lined aluminum tubes.

A leaky automobile windshield was sealed to its rubber gasket with the product of this example using the following procedure:

Surface Preparation: Surface areas must be clean, dry and free from dirt, oil, soap and was as well as any other sealer used previously without success. Surfaces to be sealed should be at 60° F or higher.

Application: Pressing tube lightly, apply sealer to problem area making certain that the sealer is applied as deeply as possible and that a continuous wet film is formed between surfaces to be sealed. The sealer may be considered "dry" when it turns from milk-white to crystal-clear and colorless (in approximately 15 minutes to several hours depending on thickness of application, temperature, and humidity). Rather than applying one heavy coat, faster drying may be accomplished by applying two light coats and allowing the first coat to clear before applying the second. Check clear film for continuity, if not continuous apply another coat and let dry. Allow clear film to cure overnight before subjecting to rainy weather. Full cure is obtained in approximately 3 to 7 days depending on temperature and humidity. If subjected to long continuous downpour, the sealer film will turn from crystal-clear to slightly translucent. Despite this color change, the sealing properties are not affected and the film will regain its crystal-clear appearance again on drying.

EXAMPLE III

To a stainless steel clean tank with agitation was added 13 parts of Rhoplex AC-61. Rhoplex AC-61 is a product of Rohm & Haas sold as an aqueous acrylic emulsion. AC-61 has the following physical properties:

| | |
|---|---|
| Solids | 46-47% |
| pH (ash shipped) | 9.5 – 10.0 |
| Appearance | White Milky Liquid |
| Weight per gallon | 8.9 lbs. |
| Specific gravity of solids | 1.13 |
| Minimal-film-forming Temperature | 18-20° C |

AC 61 is believed to be a polymer of about 48 parts ethyl or butyl acrylate, about 48 parts methylmethacrylate, about 1 part of acrylic acid and about 3 parts of a nitrogen containing monomer, as defined herein.

A thickening and suspending agent intermediate was prepared in a separate stainless steel tank by adding 96.70 parts of water then adding 3.0 parts of hydroxyethyl cellulose, non-reactive with silane, with agitation. The mixture was heated to 85° C and 0.15 parts of methyl parahydroxy benzoate and 0.15 parts of propyl parahydroxy benzoate were added. The mixing was continued at 85° C for approximately 20 minutes until smooth and homogenous. The mixture was then cooled to 45° C.

To the acrylic dispersion was then added with agitation 4.75 parts of the suspending agent intermediate. Agitation was continued until the mixture was smooth and homogenous. An additional 82.40 parts of Rhoplex AC-61 was then added slowly with agitation and the agitation was continued until the mixture was again homogenous. Then 0.75 parts of propylene glycol and 0.10 parts of gammaglycidoxypropyltrimethoxysilane were slowly added with continued agitation. The agitation was continued for 20 minutes to insure that the mixture was homogenous. The mixture should have a viscosity using a Brookfield No. 4 spindle at 25° C at 6 rpm of 2,500 to 3,500 cps. Vicsocity of 60 rpm should be 500 to 700 cps. If the viscosity is too high, water can be added. The finished product has a pH of 9.0 to 10.0. The solids content is 44± 1.5%. The product is to be marketed in one fluid ounce wax-lined aluminum tubes.

Broken china plates and crystal were mended using the above-described adhesive, and after being mended and allowed to cure were washed in a dishwasher using Cascade and at a water temperature of 180° F. The adhesive withstood the washing cycle. The adhesive was then tested for tensile strength by breaking the dishes. The dishes, in most cases broke in areas not mended by the adhesive.

The following procedure was followed in mending.

Preparation: Surfaces to be mended should be clean, dry, and free from oil, soap, paint, varnish, wash, as well as remnants of any other cement used previously. Surfaces to be bonded should be at 60° F or higher.

Procedure for porous ceramics: In most cases, no clamping is necessary. Pressing tube lightly, apply cement to only one surface. After applying the cement, before bringing the pieces together, carefully position the pieces as closely as possible—without allowing contact—when it appears the proper surface contact will be made, bring the surfaces together and apply pressure for approximately 15–20 seconds (30–40 seconds for heavier pieces). If adequate amount of cement is applied and surfaces are in proper contact, some cement should squeeze out at this point. Wipe off excess cement with clean cloth. Continue with additional pieces following the same procedure. If, after gluing, surfaces come apart for any reason, the cement will set rendering the surfaces less porous so that the procedure below for relatively less porous ceramics must be followed to complete the mending process. Allow to cure overnight before subjecting mended ceramic to dishwasher or any other stress. Full strengths are achieved in approximately 3 to 7 days depending on the temperature, humidity and porosity of the ceramic.

Procedure for non-porous (Glass)* and low porosity ceramics (very fine china): Apply cement to one surface—combine surfaces and apply pressure for approximately 1 minute or until piece added remains in position. Gently wipe off excess cement with a clean cloth; wait until cement becomes clear (2–5 minutes) before adding additional piece. For additional pieces, continue following same procedure while subjecting freshly cemented pieces to as little stress as possible, until the job is completed. Allow to cure overnight before subjecting bonded area to any stress.

*Recommended for light-duty ornament work only.

EXAMPLE IV

Windshield Sealant

To a stainless steel tank with agitation was added 12 parts by weight of a 47% solids aqueous emulsion of Rhoplex AC-34. Rhoplex AC-34 is a product of Rohm & Haas sold as an aqueous acrylic emulsion. The product has the following physical properties:

| | |
|---|---|
| Appearance | White milky liquid |
| Solids content | 46% to 47% |
| pH (as shipped) | 9.5 to 10.0 |
| Weight per gallon, pounds | 8.9 |
| Specific gravity of solids | 1.15 |
| Minimal-film-forming temp. | 9° C |

The solids are believed to be essentially a polymer of 58% ethyl acrylate, 38% methyl methacrylate, 1% of acrylic acid and 3% of a nitrogen containing monomer.

A thickening and suspending agent was prepared in a separate stainless steel tank by adding 96.70 parts of water then adding 3.0 parts of hydroxyethyl cellulose with agitation. The mixture was heated to 85° C and .15 parts of methyl parahydroxy benzoate and .15 parts of propyl parahydroxy benzoate are added. The mixing was continued at 85° C for approximately 20 minutes until smooth and homogenous. The mixture was then cooled to 45° C.

With agitation was then added to the acrylic polymer emulsion 4.75 parts of the suspending agent.

Then an additional 5 parts of the Rhoplex AC-34 was added with agitation.

An additional 66 parts of Rhoplex AC-61 was then added. Then 0.75 parts of propylene glycol and 0.11 parts of gammaglycidoxy-propyltrimethoxysilane were added with medium agitation. The agitation was continued for 20 minutes. The viscosity of the product should now be 1,400 to 1,800 cps using a Brookfield LVF No. 4 spindle at 35° C at 60 rpm and 6,000 to 8,000 cps at 6 rpm, pH should be 9.0 to 10.0 and the percent solids should be 42± 1.5%. The product is packaged in one fluid ounce wax-lined aluminum tubes.

A leaky automobile windshield was sealed to its rubber gasket with the product of this example using the following procedure:

Surface Preparation: Surface areas must be clean, dry and free from dirt, oil, soap and wax as well as any other sealer used previously without success. Surfaces to be sealed should be at 60° F or higher.

Application: Pressing tube lightly, apply sealer to problem area making certain that the sealer is applied as deeply as possible and that a continuous wet film is formed between surfaces to be sealed. The sealer may be considered "dry" when it turns from milky-white to crystal-clear and colorless (in approximately 15 minutes to several hours depending on thickness of application, temperature and humidity). Rather than applying one heavy coat, faster-drying may be accomplished by applying two light coats and allowing the first coat to clear before applying the second. Check dried clear film for continuity-if not continuous-apply another coat and let dry. Allow clear film to cure overnight in approximately 3 to 7 days depending on temperature and humidity. If subject to long continuous downpour, the sealer film will turm from crystal-clear to slightly translucent. Despite this color change, the sealing properties are not affected and the film will regain its crystal-clear appearance again on drying.

EXAMPLE V

To a stainless steel clean tank with agitation is added 12 parts of an aqueous dispersion containing 47% solids. The solids consist of an acrylic polymer containing 46% of ethylacrylate, 52% of methylmethacrylate, 1% of dimethylaminomethylmethacrylate and 1% of acrylic acid.

A thickening and suspending agent is prepared in a separate stainless steel tank by adding 96.70 parts of water then adding 3.0 parts of hydroxyethyl cellulose, non-reactive with silane, with agitation. The mixture is heated to 85° C and 0.15 parts of methyl parahydroxy benzoate and 0.15 parts of propyl parahydroxy benzoate are added. The mixing is continued at 85° C for approximately 20 minutes until smooth and homogenous. The mixture is then cooled to 45° C.

To the acrylic dispersion in the tank is then added with agitation 4.75 parts of the suspending agent. Agitation is continued until the mixture is smooth and homogenous. An additional 82.40 parts of the acrylic polymer is then added slowly with agitation and the agitation is continued until the mixture is again homogenous. Then 0.75 parts of propylene glycol, and 0.10 parts of gamma-glycidoxypropyltrimethoxysilane are slowly added with continued agitation. The agitation is homogenous. The mixture should now have a viscosity using a Brookfield No. 4 spindle at 25° C at 6 rmp of 2,500 to 3,500 cps. Viscosity of 60 rpm should be 500 to 700 cps. If the viscosity is too high, water can be added. The finished product has a pH of 9.0 to 10.0. The solids content is 44± 1.5%. The product is to be marketed in one fluid ounce wax-lined aluminum tubes. Broken china plates and crystal are mended using the above-described adhesive, and after being mended and allowed to cure are washed in a dishwasher using a conventional dishwasher detergent such as Cascade or Electrasol and at a water temperature of 180° F. The adhesive withstands the washing cycle. The adhesive is then tested for tensile strength by breaking the dishes. Once the adhesive film is fully cured, the dishes, in most cases, break in areas not mended by the adhesive.

EXAMPLE VI

To a stainless steel clean tank with agitation is added 12 parts of an aqueous dispersion containing 47% solids. The solids consist of an acrylic polymer containing 40% of ethylacrylate, 60% of methylmethacrylate, 3% of 2(2-pyridyl) ethyl methacrylate and 1% of acrylic acid. The 2(2-pyridyl) ethyl methacrylate is produced by the procedure set forth in Example 6 of U.S. Pat. No. 2,990,403 Gehahan et al 1961.

A thickening and suspending agent is prepared in a separate stainless steel tank by adding 96.70 parts of water then adding 3.0 parts of hydroxyethyl cellulose, non-reactive with silane, with agitation. The mixture is heated to 85° C and 0.15 parts of methyl parahydroxy benzoate and 0.15 parts of propyl parahydroxy benzoate are added. The mixing is continued at 85° C for approximately 20 minutes until smooth and homogenous. The mixture is then cooled to 45° C.

To the acrylic dispersion in the tank is then added with agitation 4.75 parts of the suspending agent. Agitation is continued until the mixture is smooth and homogenous. An additional 82.40 parts of the acrylic polymer is then added slowly with agitation and the agitation is continued until the mixture is again homogenous. Then 0.75 parts of propylene glycol and 0.10 parts of gamma-glycidoxypropyltrimethoxysilane are slowly added with continued agitation. The agitation is continued for 20 minutes to insure that the mixture is homogenous. The mixture should now have a viscosity using a Brookfield No. 4 spindle at 25° C at 6 rpm of 2,500 to 3,500 cps. Viscosity at 60 rpm should be 500 to 700 cps. If the viscosity is too high, water can be added. The finished product has a pH of 9.0 to 10.0. The solids content is 44± 1.5%. The product is to be marketed in one fluid ounce wax-lined aluminum tubes. Broken china plates and crystal are mended using the above-described adhesive, and after being mended and allowed to cure are washed in a dishwasher using a conventional dishwasher detergent such as Cascade or Electrasol and at a water temperature of 180° F. The adhesive withstands the washing cycle. The adhesive is then tested for tensile strength by breaking the dishes. Once the adhesive film is fully cured, the dishes, in most cases, break in areas not mended by the adhesive.

We claim:

1. An aqueous adhesive dispersion composition of pH of 8 to 12 containing 25 to 75% by weight of water having dispersed therein reaction product of A and B, as defined below:

A. a water insoluble binder polymer having the following structural formula:

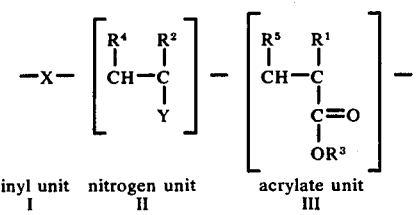

vinyl unit I    nitrogen unit II    acrylate unit III where $R^1$ and $R^2$, which can be same or different are selected from H, lower-alkyl groups of 1 to 4 carbon atoms, halogens, —$CH_2COOR$, —COOR, and —$CH_2COOH$ groups where R is a lower alkyl group of 1 to 8 carbon atoms;

$R^3$ is selected from H and lower alkyl groups of 1 to 8 carbon atoms, at least or portion of $R^3$ radical being H to give free carboxyl groups;

$R^4$ and $R^5$, which can be same or different, are selected from H, —COOH and —COOR groups, where R is as defined above;

X is derived from copolymerizable vinyl monomers and is different from the acrylate unit III;

Y is a nitrogen-containing radical of unit II which is derived from a nitrogen-containing monomer; radical Y is selected from the following radicals:

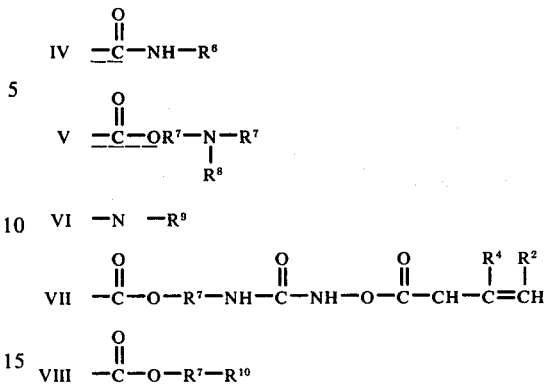

where $R^6$ is selected from H, —$R^7 NR^8$ and —$R^7OH$;

$R^7$ and $R^8$ being same or different lower alkyl radicals of 1 to 5 carbon atoms;

$R^9$ is a heterocyclic nitrogen-containing group selected from substituted ethylene urea groups;

$R^{10}$ is a heterocyclic nitrogen-containing group selected from pyridyl groups; and B. an effective amount, to effect crosslinking of the binder polymer, of a silane containing both alkoxy and epoxy functionalites.

2. Composition of claim 1 wherein the vinyl unit A is derived from acrylate monomer A represented by

where $R^{11}$ is H or an alkyl group having from 1 to 4 carbon atoms and $R^{12}$ is an alkyl radical having from about 1 to 14 carbon atoms; acrylate monomer B represented by

where $R^{11}$ is H or an alkyl group having from 1 to 4 carbon atoms and $R^{22}$ is an alkyl radical having from about 13 to 20 carbon atoms; and mixtures thereof.

3. Composition of claim 2 wherein Tg of the binder polymer is selected from the values of below 0° C and between 10° C and 25° C.

4. Composition of claim 3 wherein the $R^{12}$ radical of the acrylate monomer A has 3 to 12 carbon atoms when $R^{11}$ is H or methyl, and when $R^{11}$ is alkyl $R^{12}$ has 6 to 14 carbon atoms; $R^{22}$ has 13 to 20 carbon atoms when $R^{11}$ is H and $R^{22}$ has 1 to 5 or 15 to 20 carbon atoms when $R^{11}$ is methyl.

5. Composition of claim 4 wherein $R^{11}$ is H or methyl and wherein the nitrogen monomer is selected from amino and loweralkyl amino loweralkyl acrylates and methaacrylates, pyridyl loweralkyl acrylates and methacrylates, and mixtures thereof.

6. Composition of claim 1 wherein the vinyl unit is derived from acrylate monomers selected from $C_1$ to $C_4$ alkyl acrylates, methacrylates and mixtures thereof; the nitrogen unit is derived from monomers selected from amino and $C_1$ to $C_5$ alkyl amino and $C_1$ to $C_5$ alkyl acrylates and methacrylates, pyridyl $C_1$ to $C_5$ alkyl acrylates and methacrylates, and mixtures thereof; and the acrylate unit III is derived from monomers selected from acrylic acid, methacrylic acid and mixtures thereof.

7. Composition of claim 6 wherein the composition includes an effective amount of hydroxyethyl cellulose and propylene glycol to provide freeze-thaw stability.

8. Composition of claim 7 wherein the silane is selected from beta- (3, 4 epoxycyclohexyl) ethyltrimethoxy silane, gamma-glycidoxypropyltrimethoxy silane and epoxytrimethoxy silane.

9. Composition of claim 8 wherein the vinyl unit I is derived from monomers selected from a mixture of methyl methacrylate and ethyl acrylate or butyl acrylate.

10. Composition of claim 9 wherein the unit II is derived from nitrogen monomers selected from pyridyl ethyl methacrylate, dimethylaminoethyl methacrylate, dimethylaminomethyl methacrylate and mixtures thereof.

11. Composition of claim 6 wherein the vinyl monomer is used in amount of at least 50% by weight and up to 99%, whereas amount of the nitrogen monomer can vary from 0.1 to 10% and the acrylate monomer from 0.1 to 5%.

12. Composition of claim 11 wherein the acrylate monomer is used in amount of 1 to 5%.

* * * * *

UNITED STATES PATENT OFFICE
CERTIFICATE OF CORRECTION

Patent No. 4,032,487                 Dated  June 28, 1977

Inventor(s)  PETER SPIROS COLUMBUS

It is certified that error appears in the above-identified patent and that said Letters Patent are hereby corrected as shown below:

Col. 2, line 5, change "3,117,170" to --3,177,170--;

Col. 6, line 17, change "applied" to --allied--;

Col. 10, line 4, change "mending" to --mended--;

Col. 12, line 41, change "wash" to --wax--;

Signed and Sealed this

Sixth Day of December 1977

[SEAL]

Attest:

RUTH C. MASON
*Attesting Officer*

LUTRELLE F. PARKER
*Acting Commissioner of Patents and Trademarks*